United States Patent
Elgammal et al.

(10) Patent No.: US 12,030,781 B2
(45) Date of Patent: Jul. 9, 2024

(54) METHOD OF PREPARING CYCLOSILANE

(71) Applicant: The Coretec Group, Tulsa, OK (US)

(72) Inventors: Ramez Ahmed Elgammal, Tulsa, OK (US); Michael Anthony Kraft, Tulsa, OK (US)

(73) Assignee: The Coretec Group Inc., Ann Arbor, MI (US)

( * ) Notice: Subject to any disclaimer, the term of this patent is extended or adjusted under 35 U.S.C. 154(b) by 466 days.

(21) Appl. No.: 17/598,377

(22) PCT Filed: Mar. 30, 2020

(86) PCT No.: PCT/US2020/025694
§ 371 (c)(1),
(2) Date: Sep. 27, 2021

(87) PCT Pub. No.: WO2020/205723
PCT Pub. Date: Oct. 8, 2020

(65) Prior Publication Data
US 2022/0153595 A1    May 19, 2022

Related U.S. Application Data

(60) Provisional application No. 62/826,941, filed on Mar. 29, 2019.

(51) Int. Cl.
*C01B 33/04* (2006.01)
(52) U.S. Cl.
CPC .................. *C01B 33/04* (2013.01)
(58) Field of Classification Search
CPC ...................................................... C01B 33/04
See application file for complete search history.

(56) References Cited

U.S. PATENT DOCUMENTS

| | | | |
|---|---|---|---|
| 5,942,637 A | 8/1999 | Boudjouk et al. | |
| 8,975,429 B2 * | 3/2015 | Elangovan | C01B 33/04 556/406 |
| 9,290,525 B2 * | 3/2016 | Abe | C07C 211/63 |
| 2008/0009590 A1 | 1/2008 | Ziche et al. | |
| 2008/0085373 A1 | 4/2008 | Karshtedt et al. | |

(Continued)

FOREIGN PATENT DOCUMENTS

| | | |
|---|---|---|
| EP | 1284306 | 8/2011 |
| JP | 203313190 | 11/2003 |

(Continued)

OTHER PUBLICATIONS

West, R. and Carberry, E. (1975). Permethylpolysilanes: Silicon analogs of hydrocarbons. Science. vol. 189 (4198). Jul. 18, 1975. pp. 179-189.

(Continued)

*Primary Examiner* — Samir Shah
*Assistant Examiner* — Jordan W Taylor
(74) *Attorney, Agent, or Firm* — Carlson, Gaskey & Olds, P.C.

(57) ABSTRACT

A method includes producing a substituted cyclosilane by combining in a solvent the following: (i) halogenated cyclosilane, (ii) at least one of tri-alkyl or tri-aryl silane, and (iii) a complexing agent that includes at least one of ammonium halide or phosphonium halide. The halogenated cyclosilane reacts to produce the substituted cyclosilane.

20 Claims, 1 Drawing Sheet

(56) References Cited

U.S. PATENT DOCUMENTS

| | | |
|---|---|---|
| 2012/0024223 A1 | 2/2012 | Torres, Jr. et al. |
| 2012/0064022 A1 | 3/2012 | Wray et al. |
| 2013/0026453 A1 | 1/2013 | Kunze et al. |
| 2014/0012029 A1 | 1/2014 | Abe et al. |
| 2016/0311692 A1 | 10/2016 | Kitamura et al. |
| 2017/0349444 A1 | 12/2017 | Wagner et al. |

FOREIGN PATENT DOCUMENTS

| | | |
|---|---|---|
| JP | 2005120029 | 5/2005 |
| WO | 2011094191 | 8/2011 |
| WO | 2012002995 | 1/2012 |

OTHER PUBLICATIONS

Han, Y., Anderson, K., Hobbie, E.K., Boudjouk, P., and Kilin, D.S. (2018). Unraveling photodimerization of cyclohexasilane from molecular dynamics studies. The Journal of Physical Chemistry Letters. vol. 9. pp. 4349-4354.

Kohut, A., Dai, X., Pinnick, D., Schulz, D.L., and Voronov, A. (2011). "Host-guest" interaction between cyclohexasilane and amphiphilic macromolecules. Soft Matter. vol. 7. pp. 3717-3720.

Kohut, A., Dai, X., Pinnick, D., Schulz, D.L., and Voronov, A. (2011). Supporting information for: "Host-guest" interaction between cyclohexasilane and amphiphilic macromolecules. Supplementary Material (ESI) for Soft Matter.

Kohut, A., Kudina, O., Dai, X., Schulz, D.L., Voronov, A. (2011). Host guest interactions between a nonmicellized amphiphilic invertible polymer and insoluble cyclohexasilane in acetonitrile. Langmuir. vol. 27. pp. 10356-10359.

Corey, J.Y., Zhu, X-H., Bedard, T.C., and Lange, L.D. (1991). Catalytic dehydrogenative coupling of secondary silanes with Cp2MCl2/nBuLi. Organometallics. vol. 10. pp. 924-930.

Schulz, D.L., Hoey, J., Smith, J., Elangovan, A., Wu, X., Akhatov, I., Payne, S., Moore, J., Boudjouk, P., Pederson, L., Xiao, J., and Zhang, J-G. (2010). Si6H12/Polymer inks for electrospinning a-Si nanowire lithium ion battery anodes. Electrochemical and Solid-State Letters. vol. 13(10). pp. A143-A145.

Cypryk, M., Gupta, Y., and Matyjaszewski, K. (1991). Anionic ring-opening polmerization of 1,2,3,4-tetramethyl-1,2,3,4-tetraphenylcyclotetrasilane. J. Am. Chem. Soc. vol. 113. pp. 1046-1047.

Hegge, E. and Kovar, D. (1977). Preparation of cyclohexasilane, Si6H12. Angew. Chem. Int. Ed. Engl. vol 16(6). pp. 403.

Stuger, Dr. H., Lassacher, Dr. P., and Hengge, Prof. Dr. E. (1995). Inorganic Bi(cyclopentasilanyls): Synthesis and spectroscopic characterization. Journal of Inorganic and General Chemistry. vol. 621(9). pp. 1517-1522.

Dai, X., Schulz, D., and Boudjouk, P. (2009). Donor-acceptor chemistry of perhalogenated cyclohexasilane. Center for Nanoscale Science and Engineering. North Dakota State Univeristy. Aug. 16, 2009.

Specification. Process for preparing higher hydridosilanes. Applicant Evonik Degussa GmbH. Mar. 30, 2012.

International Search Report and Written Opinion for International Application No. PCT/US2020/025694 completed May 18, 2020.

International Preliminary Report on Patentability for International Application No. PCT/US2020/025694 mailed Oct. 14, 2021.

Supplementary European Search Report for European Patent Application No. 20784926.6 mailed Nov. 29, 2022.

Hengge, E. and Bauer, G. (1975). Darstllung und eigenschaften von cyclopentasilan. Monatshefte fur Chemie/Chemical Monthly vol. 106. pp. 503-512. 1975. [+ English abstract].

* cited by examiner

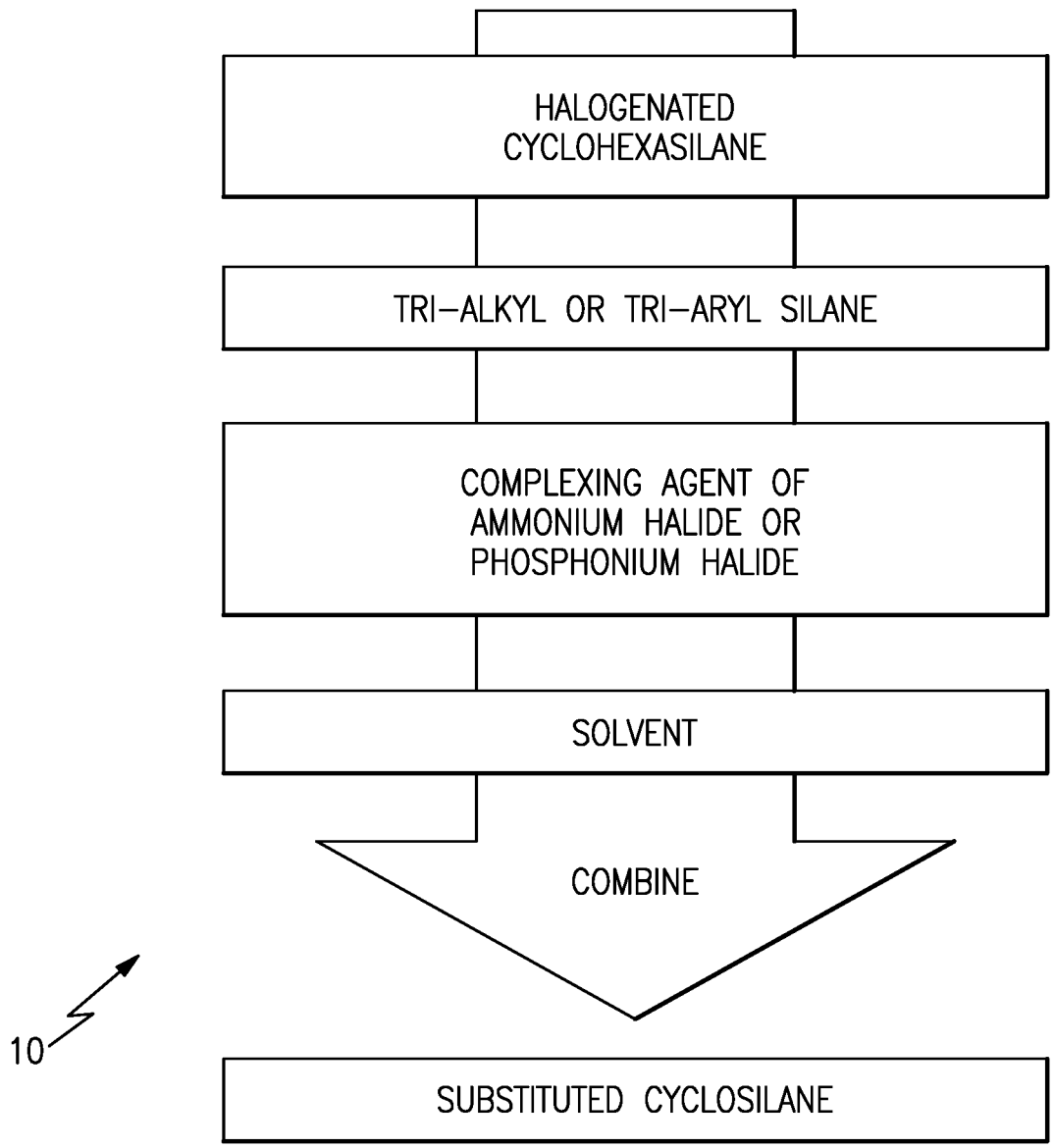

METHOD OF PREPARING CYCLOSILANE

BACKGROUND

Silicon-based devices are ubiquitous in electronic and other devices. The silicon in such devices is often in the configuration of a thin film or nanoparticle. These and other configurations can be manufactured in relatively high states of purity from monosilane gas using processes such as chemical vapor deposition (CVD) or plasma enhanced chemical vapor deposition (PECVD). Liquid precursors have also been considered for manufacturing silicon. For example, cyclopentasilane solution is deposited as a film and then dried and calcined to produce a silicon film. Despite the relative ease of producing silicon from liquid precursor, however, there are considerable challenges in producing the liquid precursor itself.

SUMMARY

A method according to an example of the present disclosure includes producing a substituted cyclosilane by combining in a solvent the following: (i) halogenated cyclosilane, (ii) at least one of tri-alkyl or tri-aryl silane, and (iii) a complexing agent including at least one of ammonium halide or phosphonium halide, the halogenated cyclosilane reacting to produce the substituted cyclosilane.

In a further example, the halogenated cyclosilane has five or six silicon atoms.

In a further example, (ii) is the tri-alkyl silane.

In a further example, (ii) is the tri-aryl silane.

In a further example, (iii) is the ammonium halide.

In a further example, (iii) is the phosphonium halide.

In a further example, the at least one of ammonium halide or phosphonium halide includes butyl or ethyl.

In a further example, the halogen of the halogenated cyclosilane is selected from the group consisting of chlorine, bromine, iodide, and combinations thereof.

In a further example, the halogenated cyclosilane has six silicon atoms, (ii) is the tri-alkyl silane, and (iii) is the phosphonium halide.

A method according to another example of the present disclosure includes producing a mixture by combining in a solvent the following: (i) halogenated cyclohexasilane, (ii) at least one of tri-alkyl or tri-aryl silane, and (iii) a complexing agent including at least one of ammonium halide or phosphonium halide; agitating the mixture, the halogenated cyclohexasilane reacting in the mixture to produce substituted cyclohexasilane; and separating the substituted cyclohexasilane from the mixture to produce pure substituted cyclohexasilane.

In a further example, the agitating includes stirring.

In a further example, the separating includes distillation.

In a further example, (ii) is the tri-alkyl silane and (iii) is the phosphonium halide.

In a further example, (ii) is the tri-alkyl silane and (iii) is the ammonium halide.

In a further example, (ii) is the tri-aryl silane and (iii) is the phosphonium halide.

In a further example, (ii) is the tri-aryl silane and (iii) is the ammonium halide.

A method according to another example of the present disclosure includes producing a substituted cyclosilane of formulation $Si_6R_{12}$, where Si is silicon and R is hydrogen, by combining in a solvent the following: (i) halogenated cyclosilane of formulation $[X^a][Si_6X^1_{14}]$, where $X^a$ is a counter-ion including at least one of $NR^h_4$ or $PR^h_4$, wherein N is nitrogen, P is phosphorous, and $R^h$ is a halide, and $X^1$ is a halogen (ii) a compound of formula $R^1_3SiH$, where $R^1$ is alkyl or aryl and H is hydrogen, and (iii) a complexing agent of formula $QR^2_4X^2$ where Q is nitrogen or phosphorous, $R^2$ is butyl or ethyl, and $X^2$ is a halogen, the halogenated cyclosilane of formulation $[X^a][Si_6X^1_{14}]$ reacting to produce the substituted cyclosilane of formulation $Si_6R_{12}$.

In a further example, $X^a$ is $NR^h_4$ and Q is nitrogen.

In a further example, $X^a$ is $PR^h_4$ and Q is nitrogen.

In a further example, Q is phosphorous.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates a method of producing a cyclosilane.

DETAILED DESCRIPTION

In general, processes for producing cyclosilane compounds, such as cyclohexasilane or cyclopentasilane, involve aspects that may hinder wider scale production and implementation. For example, the reactants are prohibitively expensive, the steps are numerous, complex, and/or yield widely varied results, the product yields are relatively low, there are undesirable gaseous byproducts and/or impurities, or the product is difficult to isolate. As will be appreciated from the following examples, the disclosed method 10 may be used to facilitate mitigation of one of more of such aspects to thereby enhance production of cyclosilane compounds.

FIG. 1 schematically illustrates the example method 10 for producing a substituted cyclosilane, such as a dehalogenated, hydrogen substituted cyclosilane. Various aspects of the method 10 will be described below. It is to be understood that the examples herein are non-limiting and that for particular implementations the method 10 may be integrated in conjunction with other steps.

The method 10 generally includes combining several constituents in a base solvent. For example, the constituents are solids and are dissolved in the base solvent. The base solvent may be varied but can include one or more organic solvents, such as benzene, cyclohexane, n-hexane, n-heptane, chloroform, dichloromethane, or ether. Further examples include high boiling point ether-based solvents, such as dibutyl ether, dihexyly ether, dioctyl ether, or glycol ethers (also known as glymes, e.g. diglyme or triglyme). As an example, desirable solvents may be those that have one or more of the characteristics that the solvent is inert with respect to reacting with the constituents and the constituents have good solubility in the solvent.

As shown in FIG. 1, the constituents that are combined in the solvent include: (i) halogenated cyclosilane, (ii) at least one of tri-alkyl or tri-aryl silane, and (iii) a complexing agent that includes at least one of ammonium halide or phosphonium halide. Without being bound, the order and manner of combining the constituents is not thought to be of particular importance. As an example, however, the combining may include adding the halogenated cyclosilane into the solvent until it is substantially fully dissolved, and then adding the tri-alkyl/tri-aryl silane and the complexing agent to the dissolved halogenated cyclosilane mixture until they are also substantially fully dissolved. Alternatively, separate mixtures of one or more of the constituents in the solvent may be combined to provide the reaction mixture.

In a further example, the combining is conducted at a relatively low temperature, such as in a temperature range of about 20° C. to about 120° C., and at ambient pressure. In order to facilitate the reaction, the reaction mixture may also be agitated, such as by stirring. Once combined, the mixture may be held for a period of time sufficient to substantially fully carry out the reaction. As an example, the time may be at least about one hour but may be up to about twelve hours or even up to about 48 hours. After the hold period, the substituted cyclosilane is separated from the mixture to produce relatively pure substituted cyclohexasilane. For instance, the substituted cyclosilane is separated by distillation. The end product substituted cyclosilane may have a purity of greater than 90%, or in further examples of over 98%.

In the reaction mixture the halogenated cyclosilane reacts to produce the substituted cyclosilane. For example, the tri-alkyl or tri-aryl silane serves in the reaction as a reducing agent of the halogen atoms on the halogenated cyclosilane such that hydrogen atoms from the tri-alkyl or tri-aryl silane substitute for the halogen atoms. The resulting halogenated tri-alkyl or tri-aryl silyl halide can later be removed from the reaction mixture. The complexing agent serves as a catalytic reaction initiator and is not consumed in the reaction.

The reaction is further demonstrated below in Chemical Equation 1 based on halogenated cyclosilane.

CHEMICAL EQUATION 1

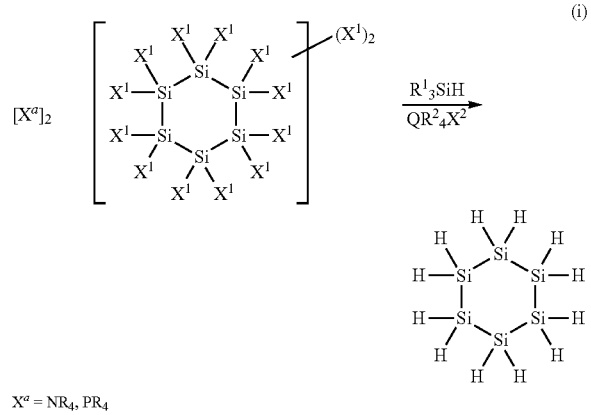

$X^a$ = $NR_4$, $PR_4$ $X^1$ = Cl, Br, I $R^1$ = alkyl, aryl
$X^2$ = Cl, Br, I
Q = N, P In further examples, the starting halogenated cyclosilane is halogenated cyclopentasilane or halogenated cyclohexasilane. In one example, as demonstrated in the Chemical Equation I above, the halogenated cyclosilane is a halogenated cyclohexasilane salt. Neutral halogenated cyclosilanes are also contemplated. For example, $X^a$ is $NR_3$ or $PR_3$ and the $(X^1)_2$ species is not present. In further examples, the tri-alkyl or tri-aryl silane is selected from $R^1_3SiH$, where $R^1$ is alkyl or aryl and H is hydrogen or other substituent for the halogen of the halogenated cyclosilane. Comparatively between the alkyl and the aryl, the alkyl facilitates reactivity and may also be of lower cost. In additional examples, the complexing agent is of formula $QR^2_4X^2$, where Q is nitrogen or phosphorous, $R^2$ is butyl or ethyl, and $X^2$ is a halogen. For instance, the complexing agent is provided in the reaction mixture in an amount from 5 mol % to 25 mol %.

The example constituents and reaction advantageously facilitate a "one-step" synthesis, avoidance of metal (e.g., lithium) hydride constituents, and avoidance of producing silane gas (e.g., monosilane) byproduct. Moreover, it is contemplated that method 10 can facilitate scaling, including to commercial quantities, due to the one-step process and avoidance of silane gas byproduct.

The following working example demonstrates further aspects of this disclosure.

Example 1

10 mmol of $[NEt_4]_2[Si_6Cl_{14}]$ was added to 100 mL of dibutyl ether under a blanket of $N_2$ and a stirring rate of 600 rpm at 25° C. To the reaction mixture was added 1 mmol of $[NEt_4]Cl$, followed immediately by addition of 140 mmol of $Et_3SiH$. The reaction mixture was heated to 60° C. and was complete after 12 hours. $Si_6H_{12}$ was isolated from the reaction mixture by distillation.

It is expected that that the method 10 can be scaled for larger quantities and that the relative quantities of the starting constituents can be varied for other chemistries. For instance, a molar ratio of $Si_6Cl_{14}$ to $Et_3SiH$ of at least 14:1 provides availability of one substituent hydrogen atom for each chlorine atom. A larger ratio may be used to enhance hydrogen atom availability, such as 15:1 or 20:1. A lower ratio could be used if fewer than all of the chlorine atoms are to be substituted for. The amount of $[NEt_4]Cl$ may also be varied. For example, a molar ratio of $[NEt_4]Cl$ to $Et_3SiH$ of 1:140 is used. If decreased, the reaction may take longer for completion. In further examples, the ratio is at least 1:28. If the ratio is substantially increased, there may be a diminishing effect on reaction completion time, in addition to higher cost because more is used. In further examples, the ratio is no greater than about 1:28 or about 1:14.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method comprising:
    producing a substituted cyclosilane by combining in a solvent the following: (i) halogenated cyclosilane, (ii) at least one of tri-alkyl or tri-aryl silane, and (iii) a complexing agent including at least one of ammonium halide or phosphonium halide, the halogenated cyclosilane reacting to produce the substituted cyclosilane.

2. The method as recited in claim 1, wherein the halogenated cyclosilane has five or six silicon atoms.

3. The method as recited in claim 1, wherein (ii) is the tri-alkyl silane.

4. The method as recited in claim 1, wherein (ii) is the tri-aryl silane.

5. The method as recited in claim 1, wherein (iii) is the ammonium halide.

6. The method as recited in claim 1, wherein (iii) is the phosphonium halide.

7. The method as recited in claim 1, wherein the at least one of ammonium halide or phosphonium halide includes butyl or ethyl.

8. The method as recited in claim 1, wherein the halogen of the halogenated cyclosilane is selected from the group consisting of chlorine, bromine, iodide, and combinations thereof.

9. The method as recited in claim 8, wherein the halogenated cyclosilane has six silicon atoms, (ii) is the tri-alkyl silane, and (iii) is the phosphonium halide.

10. A method comprising:
  producing a mixture by combining in a solvent the following: (i) halogenated cyclohexasilane, (ii) at least one of tri-alkyl or tri-aryl silane, and (iii) a complexing agent including at least one of ammonium halide or phosphonium halide;
  agitating the mixture, the halogenated cyclohexasilane reacting in the mixture to produce substituted cyclohexasilane; and
  separating the substituted cyclohexasilane from the mixture to produce pure substituted cyclohexasilane.

11. The method as recited in claim 10, wherein the agitating includes stirring.

12. The method as recited in claim 11, wherein the separating includes distillation.

13. The method as recited in claim 12, wherein (ii) is the tri-alkyl silane and (iii) is the phosphonium halide.

14. The method as recited in claim 12, wherein (ii) is the tri-alkyl silane and (iii) is the ammonium halide.

15. The method as recited in claim 12, wherein (ii) is the tri-aryl silane and (iii) is the phosphonium halide.

16. The method as recited in claim 12, wherein (ii) is the tri-aryl silane and (iii) is the ammonium halide.

17. A method comprising:
  producing a substituted cyclosilane of formulation $Si_6R_{12}$, where Si is silicon and R is hydrogen, by combining in a solvent the following: (i) halogenated cyclosilane of formulation $[X^a][Si_6X^1_{14}]$, where $X^a$ is a counter-ion including at least one of $NR^h_4$ or $PR^h_4$, wherein N is nitrogen, P is phosphorous, and $R^h$ is a halide, and $X^1$ is a halogen (ii) a compound of formula $R^1_3SiH$, where $R^1$ is alkyl or aryl and H is hydrogen, and (iii) a complexing agent of formula $QR^2_4X^2$ where Q is nitrogen or phosphorous, $R^2$ is butyl or ethyl, and $X^2$ is a halogen, the halogenated cyclosilane of formulation $[X^a][Si_6X^1_{14}]$ reacting to produce the substituted cyclosilane of formulation $Si_6R_{12}$.

18. The method as recited in claim 17, wherein $X^a$ is $NR^h_4$ and Q is nitrogen.

19. The method as recited in claim 17, wherein $X^a$ is $PR^h_4$ and Q is nitrogen.

20. The method as recited in claim 17, wherein Q is phosphorous.

* * * * *